United States Patent
Twig et al.

(10) Patent No.: US 10,936,610 B2
(45) Date of Patent: Mar. 2, 2021

(54) EXECUTING AND PROCESSING CORPORATE TRAVEL SEARCH RESULTS

(71) Applicant: TripActions, Inc., Palo Alto, CA (US)

(72) Inventors: Ilan Ezra Twig, Redwood City, CA (US); Ariel Cohen, Palo Alto, CA (US)

(73) Assignee: TripActions, Inc., Palo Alto, CA (US)

( * ) Notice: Subject to any disclaimer, the term of this patent is extended or adjusted under 35 U.S.C. 154(b) by 199 days.

(21) Appl. No.: 16/113,472

(22) Filed: Aug. 27, 2018

(65) Prior Publication Data

US 2019/0065564 A1 Feb. 28, 2019

Related U.S. Application Data

(60) Provisional application No. 62/549,966, filed on Aug. 25, 2017.

(51) Int. Cl.
*G06F 16/248* (2019.01)
*G06Q 10/02* (2012.01)
*G06F 16/951* (2019.01)

(52) U.S. Cl.
CPC .......... *G06F 16/248* (2019.01); *G06F 16/951* (2019.01); *G06Q 10/025* (2013.01)

(58) Field of Classification Search
CPC . G06F 16/248; G06F 16/951; G06Q 10/0252; G06Q 10/025
USPC ........................................................ 707/722
See application file for complete search history.

(56) References Cited

U.S. PATENT DOCUMENTS

| | | | |
|---|---|---|---|
| 2004/0098287 A1* | 5/2004 | Young | G06Q 10/02 705/5 |
| 2005/0288974 A1 | 12/2005 | Baranowski et al. | |
| 2008/0167908 A1* | 7/2008 | Marcken | G06Q 10/02 705/5 |
| 2011/0264501 A1* | 10/2011 | Clyne | G06Q 10/02 705/14.25 |
| 2011/0307280 A1 | 12/2011 | Mandelbaum | |
| 2013/0031506 A1* | 1/2013 | Diaz | G06Q 50/12 715/781 |
| 2013/0041696 A1* | 2/2013 | Richard | G06Q 30/06 705/5 |
| 2013/0041902 A1* | 2/2013 | Swann | G06F 16/951 707/737 |
| 2013/0290324 A1* | 10/2013 | Gibergues | G06F 16/9535 707/731 |
| 2013/0325557 A1* | 12/2013 | Ricci | G06Q 30/0206 705/7.35 |

(Continued)

*Primary Examiner* — Evan Aspinwall
(74) *Attorney, Agent, or Firm* — Cynthia M. Gilbert; Blueshift IP LLC (57) ABSTRACT

A technique is described for executing and displaying search results, such as for a travel search engine. The technique includes the generation of search results by querying the one or more databases based on a search request for a travel reservation by a user, who is a member of an organization having a travel expense policy. A target cost associated with the search request is determined based on the generated search results and on the travel expense policy. One or more of the search results can be annotated with a positive weight or with a calculated reward amount based on a comparison of the corresponding cost and the target cost. A graphical user interface is created having a listing of the search results, wherein the search results are rendered for display in an order based on at least one annotation.

19 Claims, 7 Drawing Sheets

(56) References Cited

U.S. PATENT DOCUMENTS

| | | | | |
|---|---|---|---|---|
| 2014/0214461 A1* | 7/2014 | Diliberto | ............... | G06Q 10/02 |
| | | | | 705/5 |
| 2015/0142482 A1* | 5/2015 | Canis | ................ | G06Q 10/02 |
| | | | | 705/5 |
| 2016/0260182 A1* | 9/2016 | Garman | ................ | G06Q 10/02 |

* cited by examiner

EXECUTING AND PROCESSING CORPORATE TRAVEL SEARCH RESULTS

CROSS-REFERENCE TO RELATED APPLICATIONS

This application claims the benefit of U.S. Provisional Application No. 62/549,966, filed Aug. 25, 2018, which is incorporated herein by reference.

FIELD OF TECHNOLOGY

The present disclosure relates generally to the field of search engines, more specifically, to systems and methods of executing and displaying search results of a travel search engine.

BACKGROUND

Travel has always played an important role in the facilitation of modern business. The need to meet with colleagues, prospective clients, suppliers, customers, and many other functions is material and imperative for conducting successful business. While video conferencing, telephone calls, and specialized "virtual" collaborative meeting rooms do enable the facilitation of virtual meetings and "hangouts" for people from all over the world, still, it is undeniable that face-to-face meetings are critical for conducting a healthy and thriving business. Not surprisingly, as a result, corporations spend large amounts of money each year on traveling to enable the facilitation and growth of their respective businesses. In fact, in many companies, corporate travel expenditure is one of the largest items in the corporate budget, perhaps second only to headcount costs (e.g., salaries, taxes, benefits).

Some companies have implemented a "managed" travel program, in which the company leases the usage of a booking system (e.g., web-based or mobile-based) that provides access to a travel inventory of hotels, flights, rental cars, and other travel-related items. In combination, or alternatively, companies may also partner with a travel agency which provides the actual fulfillment and support of the travel bookings. Other companies may forgo the use of a managed travel program and instead let their employees use the booking systems of their choice (e.g., online travel agencies, or "OTAs") for both accessing the inventory and fulfilling the bookings.

There are a variety of approaches for companies to manage their employees' corporate travel expenditures, including (a) policies which specify whether the company permits booking outside a tool or travel agency of choice, and (b) policies which specify guidelines regarding what class or cost of travel is a permissible expense. For example, a company can implement a "flex" policy in which employees are permitted to book their corporate travel (e.g., flights, hotels, rental cars, and rail) in their booking system of choice or through a designated travel agency (and either the company will pay the cost directly or the employee will get reimbursed for their expenditure). In another example, the company may implement a policy requiring use of a managed travel program, and travel booking will only be allowed through that system. The policy may state that booking outside of this system is not permitted, and such outside bookings will not be eligible for reimbursements. In some cases, a company can implement a "light" policy for class/fare/cost rules in which the company releases a formal document with high-level instructions on what is allowed and what is not allowed for corporate travel (e.g., business class flights are only permitted for an executive on long flights exceeding 10 hours). In other cases, a company may implement a "strict" policy, in which a detailed policy is issued that will be enforced in the booking system and/or by the travel agency. In such cases, the policy can be embedded in the travel booking tool and will prevent employees from booking items that fall "out of policy" (i.e., are not allowed under the issued corporate travel policy).

It has been determined that many employees' corporate travel expenditure aligns with the maximum policy amounts as a baseline. For example, if a policy indicates a maximum price of $500 per night for a hotel in New York City, it has been determined that an employee will spend closer to $500, even though many high quality hotels could be found for much less cost, because the employee has no incentive to spend significantly less than what the policy permits, nor do any current booking systems provide the user with useful tools for lowering their corporate travel expenditure. In fact, in some cases, the employee may have an incentive from a loyalty or rewards club to choose a more expensive travel booking option in order to obtain loyalty points or status, and to forego cheaper comparable rooms or flights that are available at a lower cost (but without such loyalty rewards). In this case, the employee actually has an incentive to use the full policy allocation to obtain value that is personal to the employee, rather than the company.

SUMMARY

Thus, a system and method is disclosed herein for executing and displaying search results, and, more particularly, for analyzing search results to rank and sort search results for a travel reservation and generate a graphical user interface having control elements and regions to facilitate corporate travel savings.

According to one aspect of the present disclosure, a method is provided for executing and displaying search results. The method includes receiving, from a user, a search request for a travel reservation, wherein the user is a member of an organization having an associated travel expense policy, and generating search results by querying one or more databases based on the search request for the travel reservation. Each search result includes a candidate travel reservation and a respective cost. The method further includes determining a target cost associated with the search request based on the generated search results and on the travel expense policy, and in response to determining that at least one of the search results has a corresponding cost that is less than the target cost of the search request by a threshold amount, annotating the at least one search result with a positive weight. The method includes generating a graphical user interface comprised of a listing of the search results, wherein the search results are rendered for display in an order based on at least one annotation.

In another aspect, further in response to determining that at least one of the search results has a corresponding cost that is less than the target cost of the search request by the threshold amount, the method includes calculating a reward amount associated with the at least one search result and that is owed to the user upon the user's selection of the corresponding search result, and annotating the at least one search result to include the calculated reward amount, wherein the annotated search result is further rendered in the graphical user interface to display a reward indicator representing the corresponding reward amount as part of the listing.

In another aspect, wherein generating the graphical user interface further includes, for each of the search results: generating, for each of the search results, a selection user interface element configured to, when activated by user input, select the corresponding search result for fulfilling the search request. A selection user interface element for the annotated search result includes the reward indicator and indicates the reward amount associated with the search result.

In another aspect, the method further includes receiving a user selection from the search results indicating an initial travel reservation; and responsive to determining that the initial travel reservation selected by the user does not have a corresponding reward amount, generating an intermediary graphical user interface that is rendered to display at least one alternative travel reservation with a reward amount for selection and a confirmation user interface element configured to receive input confirming the user's original choice.

In another aspect, the method further includes sorting the search results such that annotated search results having corresponding reward amounts are at the top of the search results.

In another aspect, wherein the generated graphical user interface is rendered to display the target cost at a top portion of the search results.

In another aspect, wherein the search results are sorted using a weighting mechanism based on at least one of the target cost, the amount of availability of candidate travel reservations, user preferences, and past booking made by the user and by associated users.

In another aspect, the method further includes determining that the search results are indicative of a dense search area based on a number of search results per unit area; and modifying the search request to decrease a location radius and executing the modified search request.

In another aspect, the method further includes determining a traveler profile associated with the user, and calculating the reward amount based on the traveler profile.

In another aspect, the method further includes determining a traveler profile associated with the user, and sorting the search results to display annotated search results in an order representing a highest total value to the user according to the traveler profile and to the company According to another aspect of the present disclosure, a system for executing and displaying search results is provided that includes one or more databases, and a hardware processor. The hardware processor is configured to receive, from a user, a search request for a travel reservation, wherein the user is a member of an organization having an associated travel expense policy; generate search results by querying the one or more databases based on the search request for the travel reservation, wherein each search result comprises a candidate travel reservation and a respective cost; determine a target cost associated with the search request based on the generated search results and on the travel expense policy; in response to determining that at least one of the search results has a corresponding cost that is less than the target cost of the search request by a threshold amount, annotate the at least one search result with a positive weight; and generate a graphical user interface comprised of a listing of the search results, wherein the search results are rendered for display in an order based on at least one annotation.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 depicts an example graphical user interface for searching and managing search results for a travel search engine according to an aspect of the present disclosure.

DETAILED DESCRIPTION

Exemplary aspects are described herein in the context of a system, method, and computer program product for executing and displaying search results from a travel search engine and booking system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure provide an end-to-end travel search engine and booking system that embodies the idea that, to an employee of a company, a corporate dollar is considered a separate, less valuable currency than a personal dollar. It has been determined that this disparity between corporate dollars and personal dollars lies at the root of the inefficiency of corporate travel expenditure. Accordingly, aspects of the present disclosure include a search engine that calculates personal user rewards according to various rulesets, including but not limited to corporate travel expenditure policies, and modifies its travel search results to indicate such personal user rewards. The described travel booking system may embed a savings-incentive concept deeply into the overall travel search and booking user experience so as to facilitate a technical platform for a company's employees to make better decisions, reduce corporate expenditure, and save money. As described herein, the described system may monitor user behavior and modify the system's behavior accordingly to drive more cost savings. Such modifications to the system's behavior may include changes to how a user's personal rewards are calculated as well as changes to how such rewards are presented graphically to the user (e.g., changes to the UI, work flow, messaging, order of search results, injection of various social aspects, etc.).

According to an aspect, the present system may determine a so-called "price-to-beat" or target cost for a particular travel booking on which a search query is executed. The target cost (also referred to as an "efficient price") may be selected as an inflection point that represents what a corporate user would choose as a price for their personal expenditure rather than a corporate expenditure. As described in greater detail below, the system determines a price-to-beat for every travel search run through the system. The determination for the price-to-beat may take into account a variety of factors, including number of results, availability, pricing, user preferences, company policy, past bookings made by the user that executes the search, and past bookings made by other users from the same company or by other users in the system at large. Search results returned by the search query that have a cost (i.e., price) that is less than the price-to-beat may be considered a booking with savings, i.e., a booking having an accompanying personal user reward. The described system annotates the search results to include any calculated accompanying personal user rewards in a graphical user interface that renders those annotated search results alongside unmodified search results for the user's review and selection.

Figure 1:
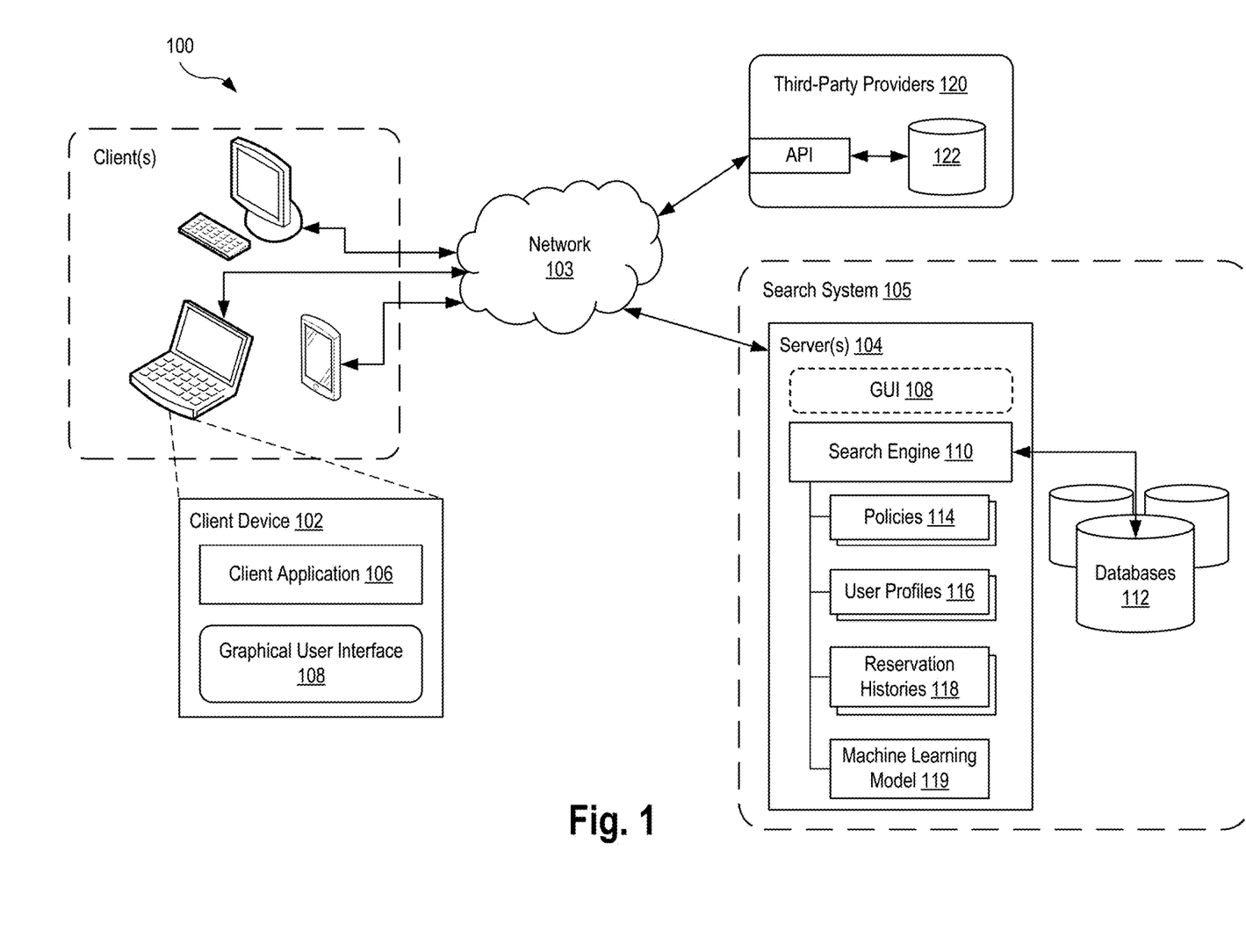
FIG. 1 is a block diagram illustrating a system for managing and executing travel search results according to an exemplary aspect.

FIG. 1 is a block diagram illustrating a travel booking system 100 for managing and executing travel search results according to an exemplary aspect. The system 100 includes one or more client devices 102 communicatively connected to a search system 105 by a network 103. Each client device 102 may include a client application 106 configured to exchange data with the search system 105 for searching, making, and managing travel bookings. In some aspects, the search system 105 may be configured as a software-as-a-service platform, of which the operator of the client device 102 is a user, for searching and booking corporate travel itineraries associated with a company that the user is an employee of.

In one aspect, the client application 106 may transmit a request (i.e., query) to the search system 105 for any travel bookings that match a plurality of search parameters (e.g., start and end date, location). In response, the search system 105 executes the query and returns any search results back to the client application 106, which renders and displays the search results in an interactive graphical user interface 108 for viewing and making travel reservations corresponding to any of the search results.

In some implementations, the client application 106 may be a web browser application configured to transmit HTTP requests to the search system 105, which returns the search results in the form of any combination of a markup document, stylesheets, scripting files, and/or graphics files (e.g., HTML, XML, CSS, JavaScript, JSON) that comprises a graphical user interface 108 having the search results. In this instance, the client application 106 renders the graphical user interface 108 for display at the client device 102 by processing the received markup document having the search results. In other implementations, the client application 106 may be a specialized software application for interacting with the search system 105, such as a mobile app configured to execute on a smartphone or mobile device.

The client device 102 (and servers 104 mentioned below) may be any computing device, desktop, laptop, handheld device, smartphone, tablet device, physical server, computer server, host, or any other electronic device suitable for executing software program code as described herein. In some aspects, the network 103 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the search system 105 may include one or more servers 104 configured to support execution of a search engine 110 that processes the received search queries. To fulfill the query, the search engine 110 may access one or more databases 112 managed by the search system 105 that stores all information related to travel booking, including currently available reservations, prior cancellations, prior searches, and other user behavior data. The search engine 110 may also access, via pre-defined APIs (application programming interfaces), one or more third-party providers 120 having databases 122 for travel-related information. The APIs exposed by the third-party providers 120, which include online travel agencies (OTAs), affiliate networks, metasearch engines, property owners, "bed banks" (for lodging), and global distribution systems (GDS), allow for programmatic access to aggregated data about available flights, hotels, rental cars, and other travel bookings.

In one aspect, the databases 112 may store other information related to travel bookings, such as a corporate travel expenditure policy and other policies 114, the current user's profile and other user profiles 116, reservation histories 118 that detail the user's current, prior, and future travel bookings, and user interactions with the search system 105 (e.g., UI analytics). The search engine 110 may be configured to retrieve and factor in such information when customizing and modifying the user's search results. In one aspect, the search engine 110 may be configured to modify the search results based on one or more machine learning (ML) models 119. The machine learning models 119 may be configured to generate a prediction of user behavior related to a travel search request and travel bookings, and may be trained on a dataset of prior searches, prior user behavior, prior cancellations, and prior bookings (e.g., found by reservation histories 118).

In one example scenario, a user may submit, via a user interface of the client application 106, a search request for a hotel reservation associated with corporate travel. The search request may include a location parameter specifying a region of New York City (e.g., SoHo neighborhood) and a start and end date of Nov. 10, 2018 to Nov. 15, 2018 (i.e., five nights). In response to such a query, the search engine 110 may (1) fetch all hotels available for this search; (2) remove results that are not relevant for that search; (3) apply policy rules on the results set; (4) order the results set by price; (5) select a price point from the sorted listing and set it as the target cost for rewards (i.e., "price-to-beat"). The search engine 110 may then (6) analyze each search result and any booking that is less than the target cost may be annotated as a booking with savings. For example, one search result specifies an available hotel room matching the search parameters and having a cost of $250 per night.

Assuming a target cost of $300 per night was selected, the search engine may calculate a possible corporate savings of $250 ($50×5=$250) if the user selects this search result. The search engine 110 may annotate the search result with a personal rewards amount of $75 calculated as a percentage of the total corporate savings as an incentive for user selection, e.g., 30% of the total corporate savings. The search engine may then (7) apply a weighing mechanism to the result set taking into account user preferences, past bookings, colleagues' bookings, etc., and (8) sort the listing of search results by price and weight for display as a listing of search results.

For sake of explanation, aspects of the present system are described in detail in the context of searching for hotel reservations; it is understood that the described aspects can be extended to any search results for travel booking and reservations, or other types of search results. As used herein, a travel booking or reservation may refer to any travel fare, reservation, itinerary item, or travel-related item, including airline fares, railway fares, automobile rentals, hotel reservations, short-term rentals, etc.

Figure 2:
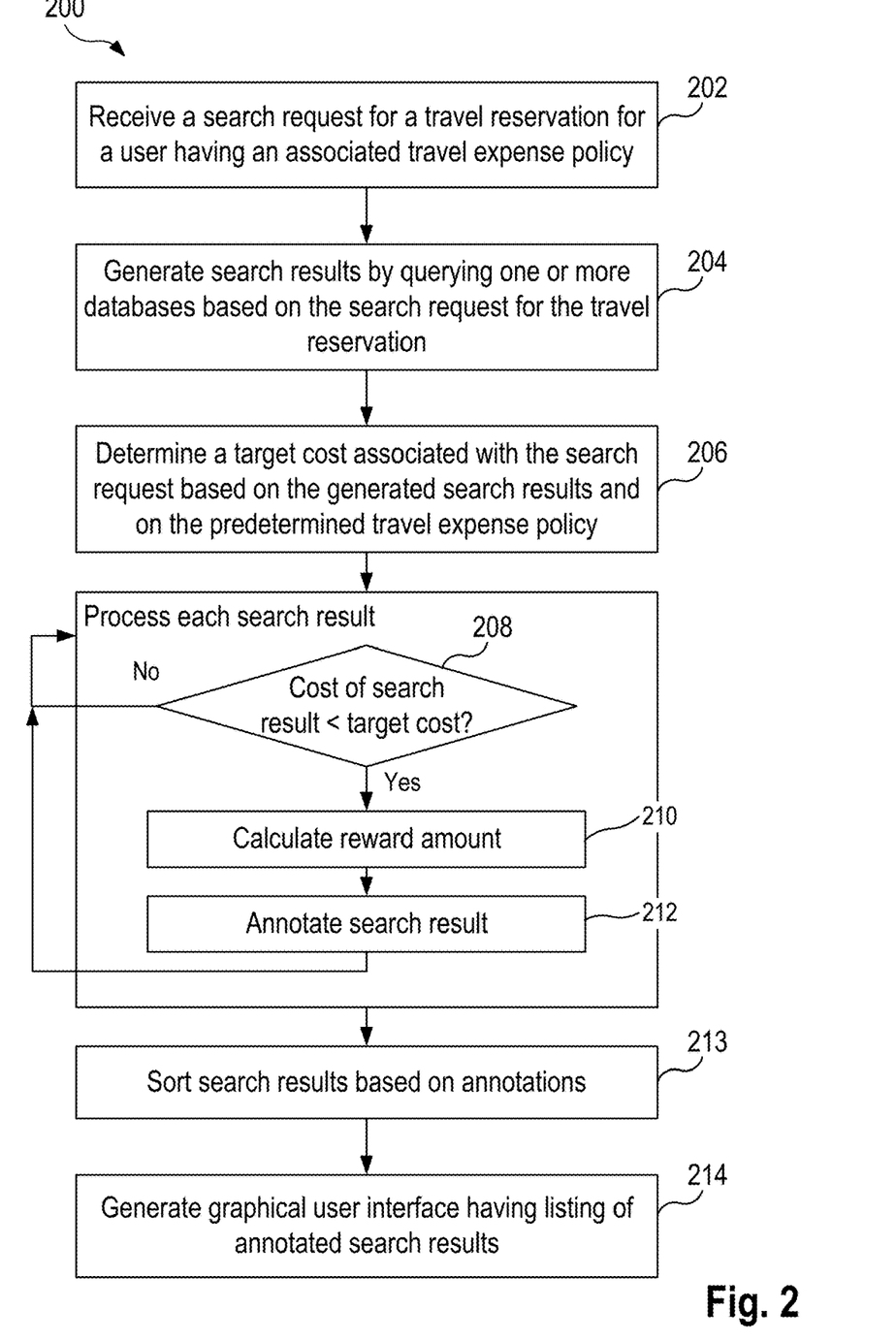
FIG. 2 is a flowchart illustrating a method for executing and displaying search results of a travel search engine according to an exemplary aspect.

FIG. 2 is a flowchart illustrating a method 200 for executing and displaying search results of a travel search engine according to an exemplary aspect. It is noted that the following description of the exemplary method makes reference to the system and components described above. At the outset, the client application 106 (e.g., executing on the client device 102) establishes a communication session with the search system 105, for example, by logging into the application using username and password credentials associated with a given user profile. The user profile may be a member of an organization (e.g., company, enterprise) having an associated travel expense policy. The client application 106, based on user input, may formulate and submit a search request for one or more travel reservations. In one implementation, the search request may be formatted as an HTTP request having a POST action and one or more search parameters as name-value pairs in the search request.

At step 202, the search engine 110 of the search system 105 may receive the search request for one or more travel reservations. The search request may include search parameters which include at least a location parameter, a start date (e.g., check-in date), and an end date (e.g., check-out date). In some aspects, the search parameters for the travel reservation may further include additional data, such as a parameter indicating a number of people for the booking (e.g., number of guests, passengers), and a rating for the travel booking, which may include an industry-standard rating (e.g., 3 stars or greater) or a proprietary rating computed according to user-generated ratings (e.g., 8.3/10 rating).

In one aspect, the location parameter indicates a geographical region for the desired location of a hotel or lodging (e.g., state, province, city, or even neighborhood in city). The location parameter may be a text value indicating a city, airport, or even landmark (e.g., "Chicago"), a postal code (e.g., zip code), a geographical indicator provided by the client device 102 (e.g., GPS information), a geographical indicator derived according to the network address of the client device 102, and/or other types of information. The location parameter may further specify a desired geographical range (e.g., "within 10 miles"), or the geographical range may be derived based on search results, as described later.

At step 204, the search engine 110 may generate a plurality of search results by querying one or more databases 112, 122 based on the search request for the travel reservation. The search engine 110 may query multiple databases 112 and databases 122 of third-party providers (i.e., via API) for hotel reservations that satisfy the provided search parameters (e.g., location, dates, star-ratings) and combine the search results into a large pool of candidate travel reservations. Each generated search result may include at least a candidate travel reservation and a respective cost. For example, one search result may indicate a hotel room availability at Hotel X for a respective starting cost of $162 per night. Each search result may further include additional information including a name of the hotel, a club network affiliation of the hotel, an industry rating, a user-generated rating, a location of the hotel, room and amenity information, and other travel information. Each search result may also include information related to the booking policy of the travel reservation, such as whether the travel booking is refundable or whether club network points are not applicable.

In some aspects, the search engine 110 initially executes one or more ancillary search queries, analyzes the intermediary search results returned from this initial query, and based on the results perform a modified query to narrow or expand the search results for an improved targeted search of candidate travel reservations. For example, the search engine 110 may analyze the intermediary search results of candidate hotel reservations and calculate a density indicator for the intermediary search results as a number of search results per unit area. If the density indicator exceeds a given threshold, the system may conclude the location of the search request is a city-like environment and shrink the radius of the search request. That is, in response to determining the density indicator exceeds a threshold density level, the search engine may modify the location parameter to decrease a geographical range of the search request and then re-execute the search request. Conversely, if the search engine determines the density indicator is less than another threshold, the search engine may characterize the location as a suburban-like environment and increase the radius of search. Accordingly, aspects of the present disclosure are able to more effectively and accurately generate relevant search results for travel reservations based on the actual underlying travel infrastructure, in contrast to known techniques which simply rely on geographical designations of a city. The described approach improves the relevancy of search results in highly dense locations (such as Manhattan, New York City) having many hotels and in which a hotel a mere mile away in New Jersey may be considered irrelevant.

In another example of analyzing intermediary search results, the generated search results may be a data set of "inventory" (e.g., a listing of all availability hotel rooms in the area) generated using an iterative process where the search engine 110 iteratively increases the search radius of a query until a threshold size of the inventory has been reached. For example, the search engine 110 may analyze the intermediary dataset of candidate hotel reservations returned from a low-mileage radius and determine whether an insufficient number of results were returned. If so, then the search engine modifies the query to increase the search radius so as to return at least a threshold number of candidate travel reservations. Requiring at least a threshold number of candidate travel reservations can improve subsequent processing of the search results, such as the calculation of the target cost for the requested travel reservation.

In some aspects, for a search request specifying a general location, the search engine 110 may execute a query that returns candidate travel reservations within a pre-determined geographical range, whereas a search request specifying a specific address or landmark, the search engine 110 may retrieve candidate travel reservations within a smaller pre-determined geographical range. For example, for a general search (e.g., "San Francisco, Calif."), the system takes into account all hotels within a five mile radius or more. In contrast, for a specific search (e.g., "Moscone Center, 747 Howard St"), the system takes into account all hotels within a smaller radius, such as 1.5 miles. In the case of the specific search, if there are insufficient search results found within the smaller radius, the system iteratively expands the search radius (and re-executes the search) until a sufficient number of search results are reached. This iterative process advantageously helps the systems identify whether the user is booking in a city or in a less urban area.

At step 206, the search engine 110 may determine a target cost associated with the search request based on the generated search results and on the travel expense policy. In some aspects, the search engine 110 may apply one or more policy rules to the search results, selectively determine a target cost from the search results, apply a weighing mechanism to the search results that takes into account a variety of factors such as the target cost, the user profile, historical reservations, and others' bookings, and sort the listing of search results by price and weight (i.e., sort for search result ranking).

In some aspects, the search engine 110 may first retrieve (e.g., from database 112) the corporate travel expense policy 114 associated with the organization of which the user is a member. The corporate travel expense policy may include a general spending limit (e.g., $300/night), as well as itemized spending limits (e.g., up to $500/night for designated high-spend areas, or up to $500/night for a given user profile based on their title in the company). For example, the corporate travel expense policy may specify different policies for different users, such as only executives can make a business class airline booking, such that if a non-executive searched for a business class tickets, the returned search results would be annotated as "out of policy". In some cases, the corporate travel expense policy may specify an excluded type of industry rating (e.g., no five-star) or class of reservation (e.g., no business class). In some aspects, the corporate travel expense policy may specify a maximum class or price for airline bookings of different flights having short or long durations. In some aspects, the system may apply a default dynamic policy in situations in which there is no managed travel policy for a company. The default dynamic policy may set a target cost that is a product of a fair market value for the travel reservation and a pre-determined multiplication factor (e.g., 1.5 times the fair market value). In some aspects, the corporate expense policy may specify a maximum cost associated with a particular search, in which the target cost (i.e., rewards eligibility) will be capped at the policy amount regardless of the other market conditions.

The search engine 110 may apply the retrieved policy to the search results to remove one or more search results that fail to comply with the policies 114. For example, the search engine may discard any search results having a corresponding cost that exceeds the maximum allowable cost specified by the corporate travel policy. In some aspects, the search engine 110 may then order the listing of search results by their corresponding cost. The search engine 110 may select an actual cost from the ordered listing, and set the selected cost as the "target cost" associated with the search request. In one implementation, the target cost may be selected from the median cost of the ordered listing of search results. In other aspects, the target cost may be derived from one or more actual costs from the ordered listing (e.g., calculated as an average cost). In some aspects, the target cost may be selected from a median cost of an ordered subset of search results having an indicated club network affiliation of which the user is a member.

In one particular aspect, the target cost may be determined according to the number of search results, the availability of candidate travel reservations, and the pricing and cost of the inventory. In one implementation, the target cost may be calculated using a subset of the search results which is selected using a pre-determined "business-acceptable" criteria and taking a point along the continuum of costs of that subset of search results. For example, the search engine may identify a subset of the hotels based on the business-acceptable criteria of having a star rating within a particular range of star ratings (e.g., 3 or 4 stars, or boutique), having a review score that exceeds a threshold score (e.g., >=7.0 rating), in an appropriate radius (e.g., taking into account the density index). The search engine may then mark a point on the pricing continuum for those properties, such as the $50^{th}$ percentile, although other points may be used.

In some aspects, the search engine 110 may determine the target cost as a user-agnostic value. In an alternative aspect, the search engine 110 may increase or decrease the target cost based on a user's history of prior travel bookings and interactions with the search system 105. That is, the search engine 110 may increase the target cost based on a determination that the given user has rarely or infrequently selected travel booking with personal user rewards, based on a conclusion that the given user requires a greater incentive for selecting travel bookings below the target cost. Similarly, the search engine may decrease the target cost based on a determination that the given user historically selects a travel booking with personal user rewards based on a conclusion that the given user requires less incentive, and further to increase the amount of corporate savings on travel expenditure. That is, the search engine 110 may apply an upward or downward bias to the target cost so as to increase the likelihood that the user selects a travel booking that is less than the target cost, while also setting the lowest target cost to maximize corporate travel costs.

The search engine 110 may then proceed to iteratively process each of the search results based on the determined target cost for this travel reservation. For each search result, at step 208, the search engine 110 compares the respective cost of a search result with the target cost (determined above) and checks whether the given travel reservation's cost is less than the target cost by at least a threshold amount.

If so, at step 210, (i.e., in response to determining that at least one of the search results has a corresponding cost that is less than the target cost of the search request by a threshold amount), the search engine 110 may calculate a reward amount associated with the at least one search result and that is owed to the user upon the user's selection of the corresponding search result. In some aspects, the rewards may be calculated by taking a percentage of the difference between target cost of the search request and the cost of the search result (e.g., 30%), which are savings that can be passed on to the user in the formal of personal rewards. In some aspects, the percentage calculated may be a predetermined percentage determined according to the retrieved corporate travel policy 114. In alternative aspects, the percentage calculated may be dynamically determined according to the user profile 116 and history 118. It is noted that the reward amount that is owed to the user upon the user's selection of the corresponding search result may be provided as a payment separate and distinct from the user's payment of the travel booking. That is, the reward amount is considered supplementary to a corporate payment method used for payment of the travel booking (e.g., corporate credit card), or even to a personal payment method which is eventually reimbursed. By way of example, the personal user reward may include a gift card or gift credits for a retail store made in the amount of the rewards amount, a form of virtual currency, or other currency, or an ability to make a charitable donation of equivalent value.

At step 212, the search engine 110 may annotate the at least one search result to include an indication that the respective cost is below the target cost. The annotation may include a weight assigned to the search result that gives a positive bias (for use in later sorting). Similarly, search results determined to not have a respective cost that exceeds the target cost may be annotated with a negative weight. In some aspects, the search engine 110 may annotate each search result based on one or more user-specific factors, such as an indication of whether the search result qualifies for a certain loyalty program and indications of a user's prior travel bookings. In some aspects, the search engine 110 may annotate each search result with company-specific factors, such as whether another user of the company has booked the same or a similar travel booking, or whether the travel booking is in or out of policy.

In some aspects, the search engine 110 may annotate the at least one search result to include the calculated reward amount. In some implementations, the search engine 110 inserts one or more data structures into the result set that specifies the calculated reward amount for the respective candidate travel reservation. In some implementations, the calculated reward amount may be calculated as a total rewards amount in contrast to the candidate travel booking's cost, which is expressed in a daily rate or per diem rate.

At step 213, the search engine 110 may sort the search results based on annotations made to the search results. For example, annotated search results may be sorted based the cost of the search result and a positive or negative weight that represents whether the respective search result is less than the target cost, as well as according to user-specific factors such as past bookings by that user, loyalty options, etc., which determines which results are displayed on the first page to the particular user. In some aspects, search results having a positive weight representing the search result has a cost that is less than the target cost may be sorted before (i.e., ranked higher) than search results having a cost is greater than the target cost.

The search engine 110 may also apply a weighing mechanism to search results that assigns a weight to the search result based on information derived from the user profile 116 and reservation histories 118 of the particular user and other users. In some aspects, the weighing mechanism may provide an increased weight on search results having a club network affiliation of which the user is a member (e.g., Marriott rewards). The weighing system takes into account relevant factors such as: the hotel's distance from the searched location, number of stars, review score, loyalty incentives, if other users from the same company have booked in that property before, if this user has booked in this property before, etc. In some aspects, the search engine 110 may retrieve a traveler profile 114 associated with the user and then sort the search results to display annotated search results in an order representing a highest total value to the user according to the traveler profile and to the company.

In some aspects, the search engine may apply the machine learning models 119 to assign a weight to each search result indicating a likelihood that the user will book the corresponding travel book. For example, the machine learning model 119 may be applied to a search result for a given hotel, with its respective hotel information as input parameters (e.g., distance, location, price, loyalty program affiliation, star rating) to generate a prediction the user will book that particular hotel. Each hotel may be assigned a weight according to this machine learning model (which may then be re-trained using the outcome of the eventual travel booking.) In one implementation, a positive or larger weight from the machine learning model can represent a higher likelihood that the user would select the respective travel booking (and is therefore displayed first), and a negative or smaller weight represents a lesser likelihood that the user would select the respective travel booking.

At step 214, after processing the search results, the search engine 110 may return the modified search results of the search request to the client application 106. The search engine 110 may generate a graphical user interface 108 comprised of a listing of the search results. In this graphical user interface 108, the listing of search results are displayed in an order based on any annotations made to the search results. In some aspects, the graphical user interface is generated such that any annotated search results are rendered to display a reward indicator representing the corresponding reward amount as part of the listing. In one aspect, the generation of a graphical user interface may refer to the creation, by the search system 105, of a markup document (e.g., HTML) or other response data that contains the listing of search results including any annotated search results. The client application 106 receives the response and renders for display, for example, on a display device of the client device 102.

FIG. 3 depicts an example graphical user interface 300 for searching and managing search results for a travel search engine according to an aspect of the present disclosure. The graphical user interface 300 includes a tabular view 302 of the listing of search results and a filter portion 303 proximate to the list of search results.

As shown, the graphical user interface 300 includes an indication of the determined target cost (i.e., "the price to beat to earn personal rewards is $231") at a top portion of the search listings. In other aspects, the graphical user interface may be rendered to display the target cost on a top portion of the "viewing window", such that the target cost remains in a top-biased location even when the user has scrolled down the listing of search results.

Each row for a search result includes a graphical representation of the candidate hotel reservation's information, as well as a selection user interface element 306 configured to, when activated by user input, select the corresponding search result for fulfilling the search request. As shown, the selection user interface element 306 for the annotated search result comprises the reward indicator and indicates the reward amount (e.g., "Earn $10") associated with the search result. The selection user interface element may be aligned in a location of the tabular view 302 with a corresponding selection user interface element 308 for search results that do not have rewards amounts (i.e., "Select"). As shown, both the buttons 306 and 308 are aligned on a right side of the tabular view. In this way, the graphical user interface advantageously provides a view of the rewards that is directly embedded in the search results 302.

In one aspect, the filter portion 303 may include one or more control user interface elements (e.g., checkboxes, radio elements, dials, sliders, text input elements) configured to, when updated by the user, modify the listing of search results to only display those search results that satisfy the criteria specified in the control user interface elements. For example, the filter portion 303 includes one or more control user interface elements indicating a toggle for whether to display only those annotated search results having a reward amount (i.e., "Earn Reward $"). In another example, the filter portion 303 may include a control user interface element configured to toggle whether to display search results that satisfy the corporate travel expense policy of the user (i.e., "In Policy"). In some aspects, the filter portion 303 may include a control user interface element configured to toggle display of search results having an annotation indicating the travel booking qualifies for a given loyalty points program.

In some aspects, the selection user interface element 306 may be configured to dynamically update the display of the reward amount based on the changes made in the filter portion 303. For example, in response to user input activating a search result filter for only those search results qualifying for a given loyalty program or only those search results that are refundable, the graphical user interface may dynamically update the rewards portion to decrease the graphically represented reward amount based on the filtered results.

Figure 4:
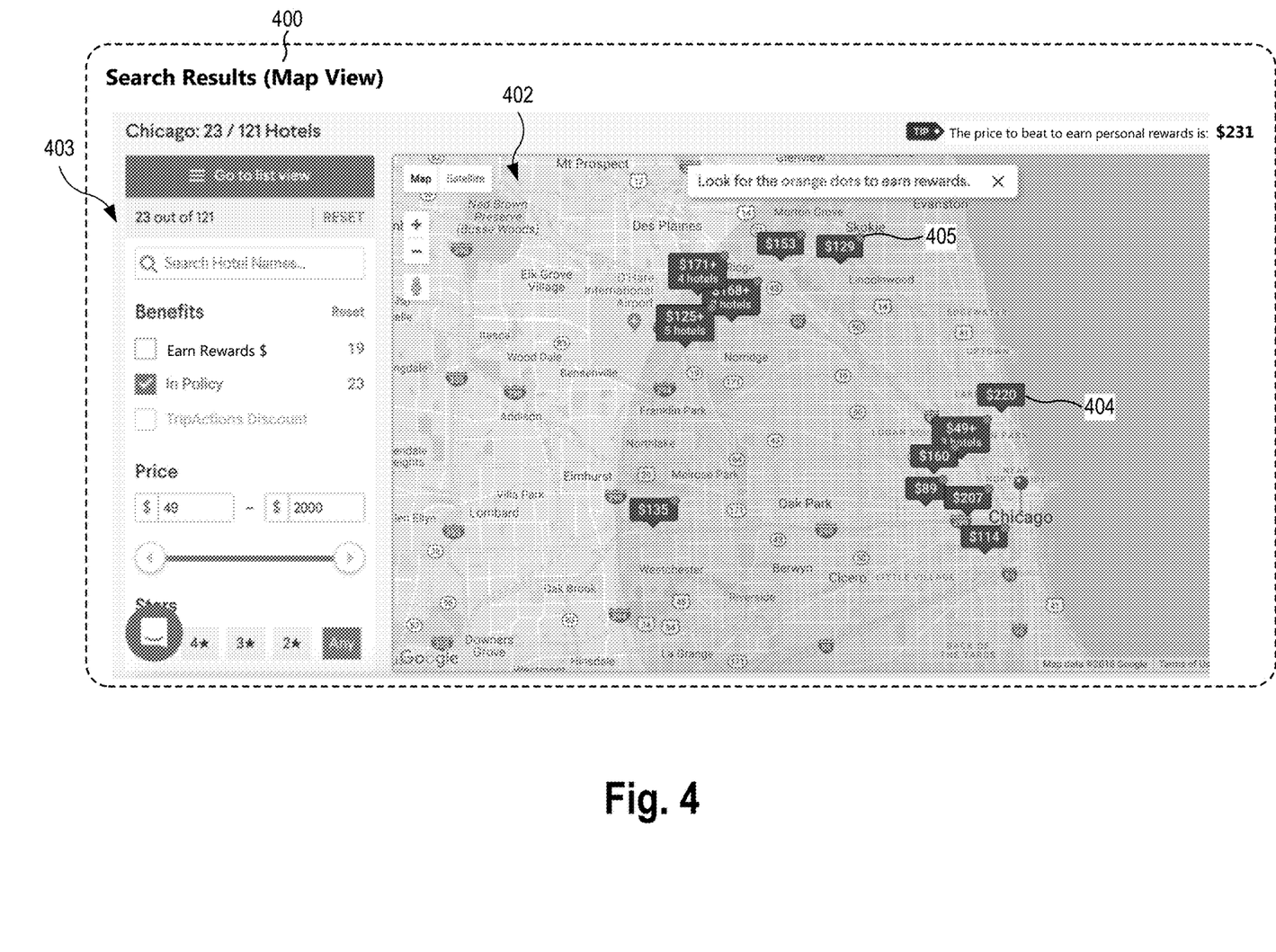
FIGS. 4 and 5 depict example graphical user interfaces having a map portion for searching and managing search results for a travel search engine according to an aspect of the present disclosure.
Figure 5:
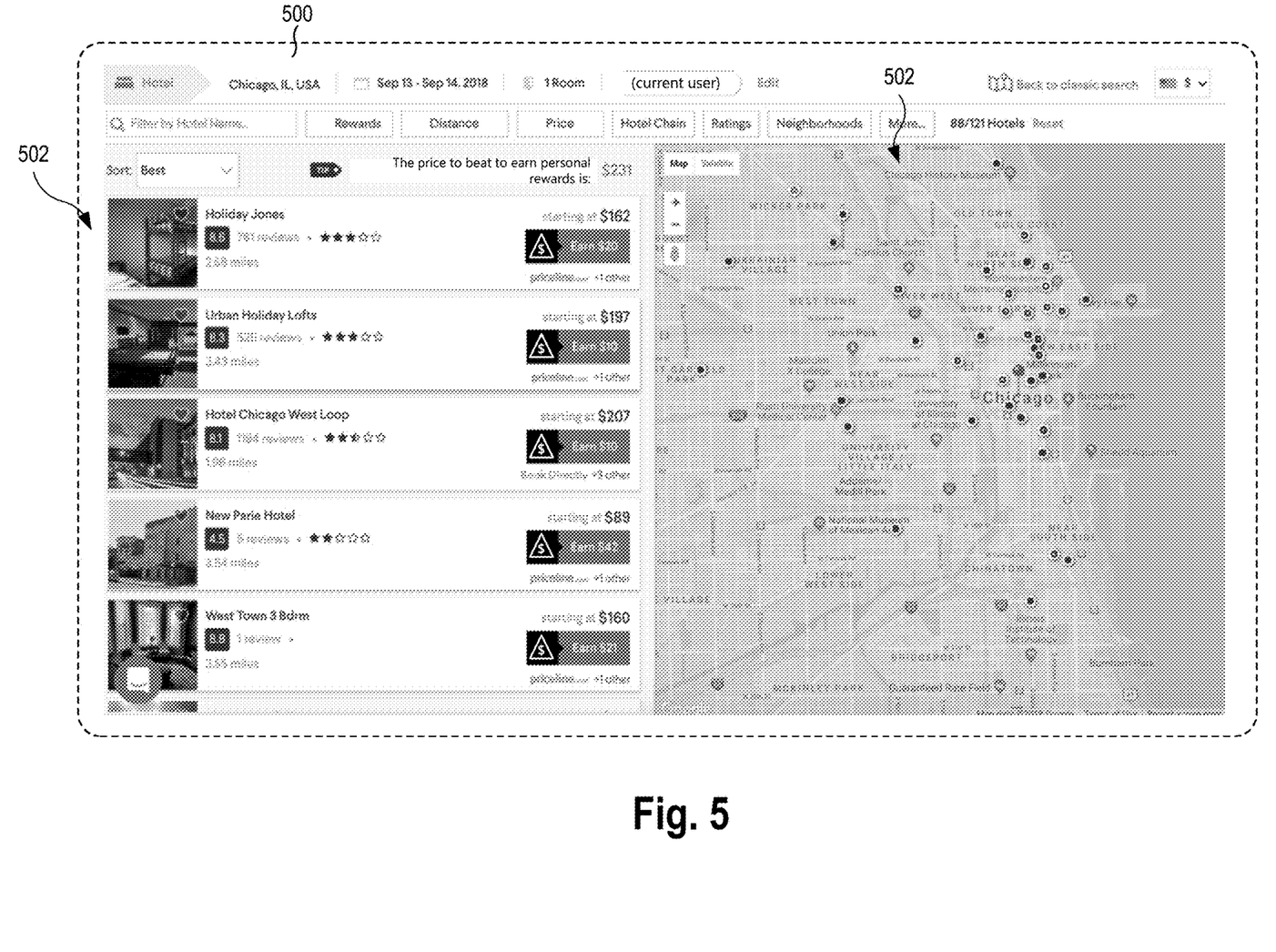

FIGS. 4 and 5 depict example graphical user interfaces 400, 500 having a map portion for searching and managing search results for a travel search engine according to an aspect of the present disclosure. The graphical user interfaces 400 and 500 are similar to the graphical user interface shown in FIG. 3 (for example, having a filter portion 403, and having a listings portion 502), with the inclusion of a map portion 402 (and 502). The map portion 402 is generated to include a plurality of location indicators 404 corresponding to the listing of search results provided on the listing portion of the graphical user interface (as shown in FIG. 5). Each of the location indicators may be annotated with an indication that the corresponding candidate hotel reservation may include a rewards amount. In the example shown, the location indicators are annotated with a colored badge 406 corresponding to a rewards indicator.

Figure 6:
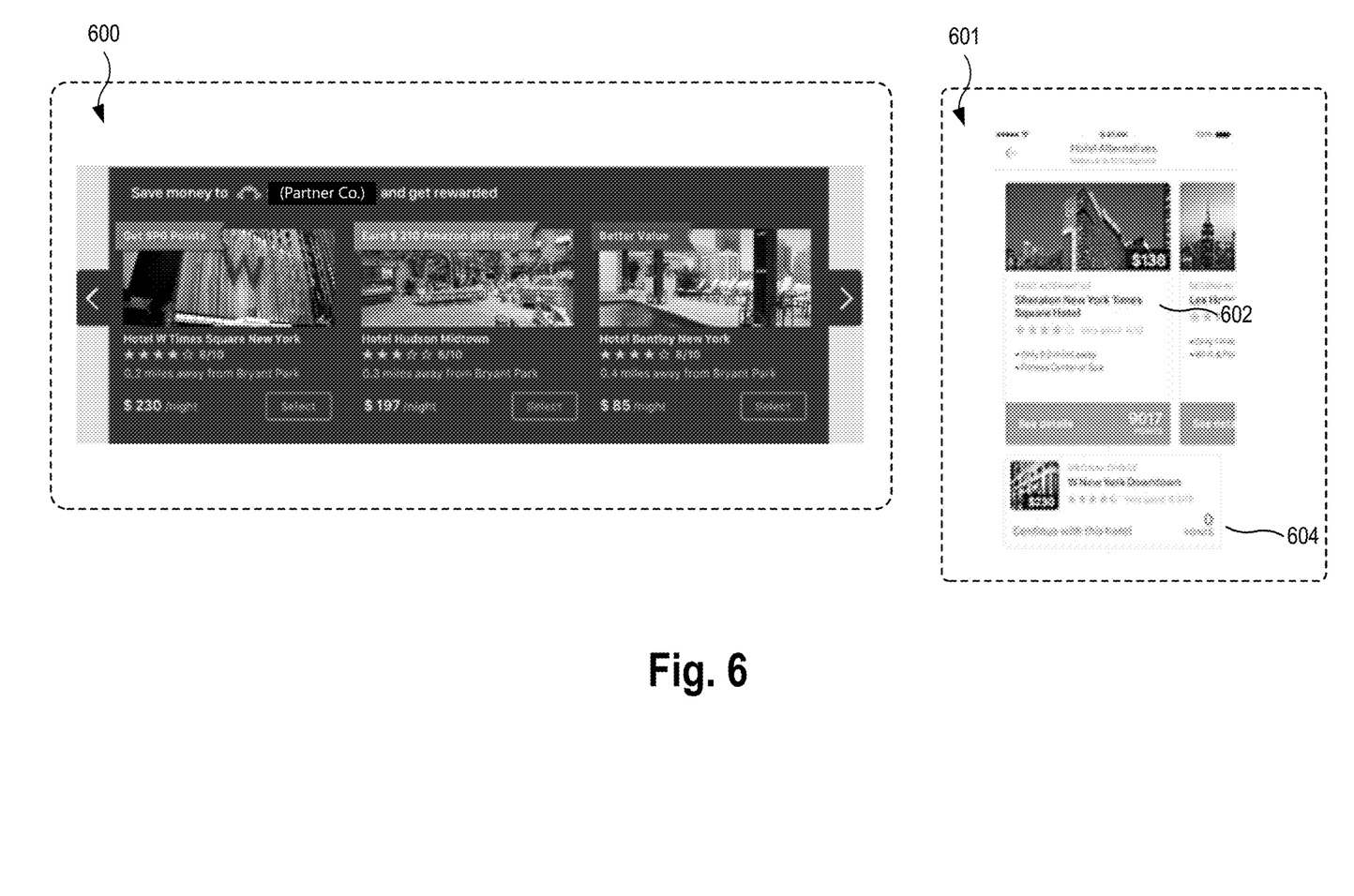
FIG. 6 depicts an example graphical user interface for providing alternative search results according to an aspect of the present disclosure.

FIG. 6 depicts an example graphical user interface 600, 601 for providing alternative search results according to an aspect of the present disclosure. According to one aspect, the search system 105 may be configured to influence the user's decision during the booking experience at various stages, not just during the search stage. The farther a user is in the process of creating a travel booking, the more the search system 105 may infer and determine about the preferences of the user for this particular booking. In addition to showing reward amounts right in the search results page, the search system 105 may be configured to generate intermediary graphical user interfaces as "last final" attempts to drive the users into selecting a higher-value or lower cost travel booking, by selecting and showing the user relevant alternative travel bookings.

In one aspect, the search system may receive a user selection from the search results indicating an initial travel reservation. For example, the user is browsing a hotel with no personal user rewards (i.e., the cost of this hotel is greater than the target cost). Responsive to determining that the initial travel reservation selected by the user does not have a corresponding reward amount, the search system 105 generates an intermediary graphical user interface 600 that is rendered to display at least one alternative travel reservation (602) with a reward amount for selection. This intermediary graphical user interface 600 also includes a confirmation user interface element 604 configured to receive input confirming the user's original choice ("Continue with this hotel").

For example, on this browsing page, the system selects and presents (i.e., in a graphical user interface) hotels that are similar to the browsed hotel, but with rewards (if any). These alternative hotels are similar in all aspects to the browser hotel, having a location that is very close to the user's choice, having a similar star level, and user rating. If the user proceeds with a particular selection, then the system may make a final attempt to affect the user's choice by showing a split screen 601 with the original user's choice as well as the similar alternatives and the rewards. The system may also highlight in the graphical user interface the differences between the alternatives and the original selection (i.e., same star level, better user rating, only 0.2 miles away).

Another aspect of the present disclosure includes an administrative-side graphical user interface. The system 105 may be configured to generate an administrative graphical user interface having reporting and administrative tools that provide information as well as graphical representations (e.g., charts) about employees' booking behavior and savings/rewards distribution. Using such information, a system administrator is able to spot outliers and guard against employees that attempt to "game" the system and over-calibrate towards rewards. The reporting tools may provide a graphical visualization into employee behavior who are, for example, maximizing rewards by shifting costs from hotels (where rewards are available) to another travel expense such as rental cars or taxis (where rewards might not be available). Such a virtualization tool may facilitate the identification of, for example, an employee that books a distant hotel room to maximize personal user rewards and takes more expensive taxis back and forth (which is expensed).

Figure 7:
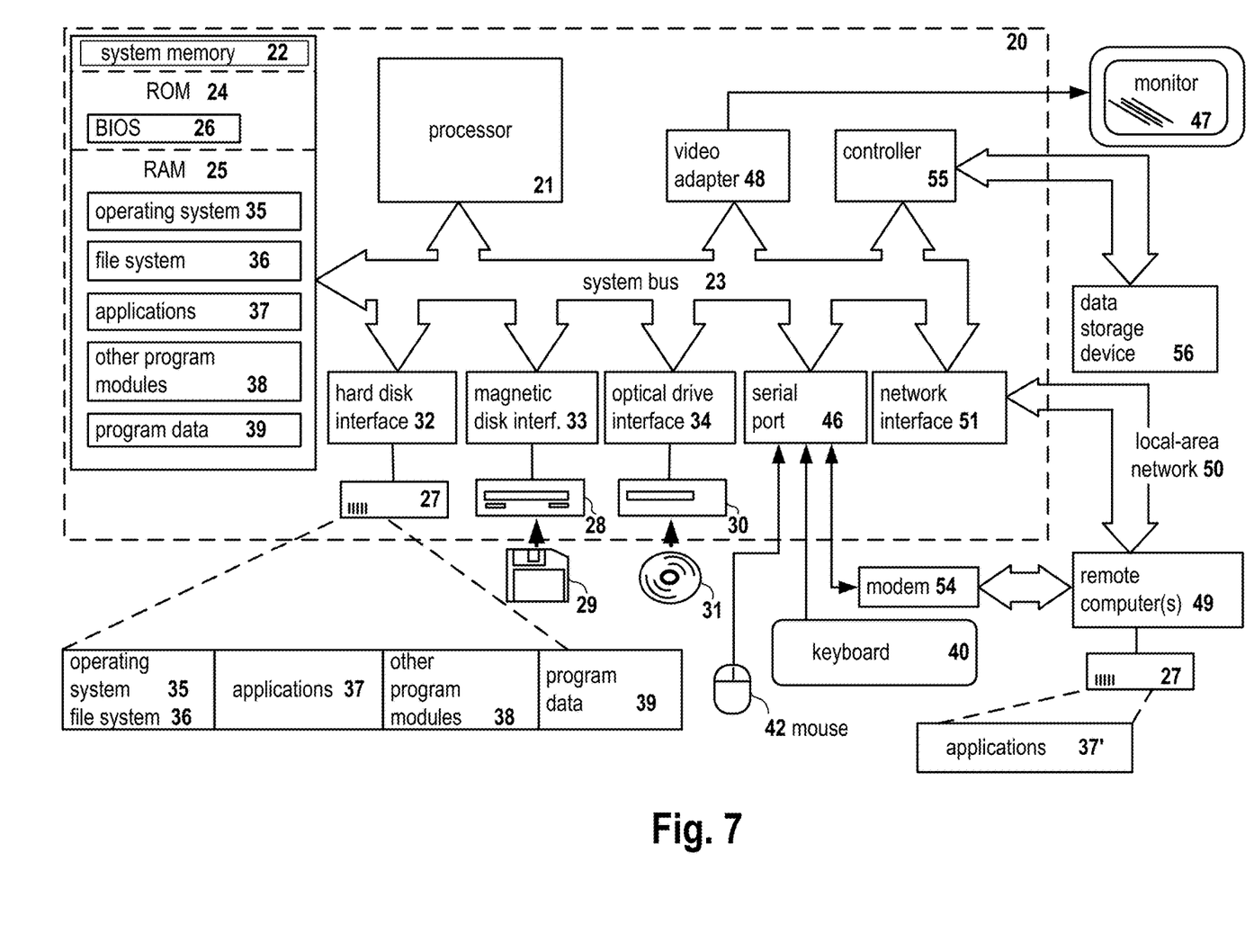
FIG. 7 is a block diagram of a computer system on which the disclosed system and method can be implemented according to an exemplary aspect.

FIG. 7 is a block diagram illustrating a computer system 20 on which aspects of systems and methods for searching and managing search result of a travel search engine may be implemented in accordance with an exemplary aspect. It should be noted that the computer system 20 can correspond to the client devices 102 and servers 104, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for executing and displaying search results, comprising:

receiving, from a user, a search request for a travel reservation, wherein the user is a member of an organization having an associated travel expense policy;

generating search results by querying one or more databases based on the search request for the travel reservation, wherein each search result comprises a candidate travel reservation and a respective cost;

determining a target cost associated with the search request based on the generated search results and on the travel expense policy;

in response to determining that at least one of the search results has a corresponding cost that is less than the target cost of the search request by a threshold amount, annotating the at least one search result with a positive weight;

generating a graphical user interface rendered to display the target cost at a top portion of the listing of the search results;

displaying, within the generated graphical user interface, a listing of the search results, wherein the search results are rendered for display in an order based on at least one annotation; and modifying the generated graphical user interface to include an indication of whether each of the listed search results satisfies the associated travel expense policy.

2. The method of claim 1, wherein further in response to determining that at least one of the search results has a corresponding cost that is less than the target cost of the search request by the threshold amount:

calculating a reward amount associated with the at least one search result and that is owed to the user upon the user's selection of the corresponding search result, and annotating the at least one search result to include the calculated reward amount, wherein the annotated search result is further rendered in the graphical user interface to display a reward indicator representing the corresponding reward amount as part of the listing.

3. The method of claim 2, wherein generating the graphical user interface further comprises, for each of the search results:

generating, for each of the search results, a selection user interface element configured to, when activated by user input, select the corresponding search result for fulfilling the search request, wherein a selection user interface element for the annotated search result comprises the reward indicator and indicates the reward amount associated with the search result.

4. The method of claim 1, further comprising:

receiving a user selection from the search results indicating an initial travel reservation;

responsive to determining that the initial travel reservation selected by the user does not have a corresponding reward amount, generating an intermediary graphical user interface that is rendered to display at least one alternative travel reservation with a reward amount for selection and a confirmation user interface element configured to receive input confirming the user's original choice.

5. The method of claim 1, further comprising:

sorting the search results such that annotated search results having corresponding reward amounts are at the top of the search results.

6. The method of claim 1, wherein the search results are sorted using a weighting mechanism based on at least one of the target cost, the amount of availability of candidate travel reservations, user preferences, and past booking made by the user and by associated users.

7. The method of claim 1, further comprising:

determining that the search results are indicative of a dense search area based on a number of search results per unit area; and modifying the search request to decrease a location radius and executing the modified search request.

8. The method of claim 1, further comprising:

determining a traveler profile associated with the user, and calculating the reward amount based on the traveler profile.

9. The method of claim 1, further comprising:

determining a traveler profile associated with the user; and sorting the search results to display annotated search results in an order representing a highest total value to the user according to the traveler profile and to the company.

10. A system for executing and displaying search results, comprising:

one or more databases; and a hardware processor configured to:

receive, from a user, a search request for a travel reservation, wherein the user is a member of an organization having an associated travel expense policy;

generate search results by querying the one or more databases based on the search request for the travel reservation, wherein each search result comprises a candidate travel reservation and a respective cost;

determine a target cost associated with the search request based on the generated search results and on the travel expense policy;

in response to determining that at least one of the search results has a corresponding cost that is less than the target cost of the search request by a threshold amount, annotate the at least one search result with a positive weight;

generate a graphical user interface rendered to display the target cost at a top portion of the listing of the search results;

display, withing the generated graphical user interface, a listing of the search results, wherein the search results are rendered for display in an order based on at least one annotation; and modifying the generated graphical user interface to include an indication of whether each of the listed search results satisfies the associated travel expense policy.

11. The system of claim 10, wherein the processor is further configured to, in response to determining that at least one of the search results has a corresponding cost that is less than the target cost of the search request by the threshold amount:

calculate a reward amount associated with the at least one search result and that is owed to the user upon the user's selection of the corresponding search result, and annotate the at least one search result to include the calculated reward amount, wherein the annotated search result is further rendered in the graphical user interface to display a reward indicator representing the corresponding reward amount as part of the listing.

12. The system of claim 11, wherein the processor configured to generate the graphical user interface further comprises, for each of the search results, is further configured to:

generate, for each of the search results, a selection user interface element configured to, when activated by user input, select the corresponding search result for fulfilling the search request, wherein a selection user interface element for the annotated search result comprises the reward indicator and indicates the reward amount associated with the search result.

13. The system of claim 10, wherein the processor is further configured to:

receive a user selection from the search results indicating an initial travel reservation; and responsive to determining that the initial travel reservation selected by the user does not have a corresponding reward amount, generate an intermediary graphical user interface that is rendered to display at least one alternative travel reservation with a reward amount for selection and a confirmation user interface element configured to receive input confirming the user's original choice.

14. The system of claim 10, wherein the processor is further configured to:

sort the search results such that annotated search results having corresponding reward amounts are at the top of the search results.

15. The system of claim 10, wherein the search results are sorted using a weighting mechanism based on at least one of the target cost, the amount of availability of candidate travel reservations, user preferences, and past booking made by the user and by associated users.

16. The system of claim 10, wherein the processor is further configured to:

determine that the search results are indicative of a dense search area based on a number of search results per unit area; and modify the search request to decrease a location radius and execute the modified search request.

17. The system of claim 10, wherein the processor is further configured to:

determine a traveler profile associated with the user, and calculate the reward amount based on the traveler profile.

18. The system of claim 10, wherein the processor is further configured to:

determine a traveler profile associated with the user; and sort the search results to display annotated search results in an order representing a highest total value to the user according to the traveler profile and to the company.

19. A non-transitory computer readable medium comprising computer executable instructions for executing and displaying search results, including instructions for:

receiving, from a user, a search request for a travel reservation, wherein the user is a member of an organization having an associated travel expense policy;

generating search results by querying one or more databases based on the search request for the travel reservation, wherein each search result comprises a candidate travel reservation and a respective cost;

determining a target cost associated with the search request based on the generated search results and on the travel expense policy;

in response to determining that at least one of the search results has a corresponding cost that is less than the target cost of the search request by a threshold amount, annotating the at least one search result with a positive weight;

generating a graphical user interface rendered to display the target cost at a top portion of the listing of the search results;

displaying, within the generated graphical user interface, a listing of the search results, wherein the search results are rendered for display in an order based on at least one annotation; and modifying the generated graphical user interface to include an indication of whether each of the listed search results satisfies the associated travel expense policy.

* * * * *

UNITED STATES PATENT AND TRADEMARK OFFICE
CERTIFICATE OF CORRECTION

PATENT NO. : 10,936,610 B2
APPLICATION NO. : 16/113472
DATED : March 2, 2021
INVENTOR(S) : Twig et al.

It is certified that error appears in the above-identified patent and that said Letters Patent is hereby corrected as shown below:

In the Specification

In Column 3, Line 44, delete "company" and insert -- company. --, therefor.

In Column 5, Line 11, delete "work flow" and insert -- workflow --, therefor.

In Column 12, Line 60, delete "results 302." and insert -- results. --, therefor.

In Column 14, Line 3, delete "browser hotel" and insert -- browsed hotel --, therefor.

In Column 14, Line 13, delete "The system" and insert -- The search system --, therefor.

In Column 15, Line 18, delete "may be also be" and insert -- may also be --, therefor.

In Column 15, Line 40, delete "personal computer 20" and insert -- computer system 20 --, therefor.

Signed and Sealed this
Twenty-second Day of November, 2022

Katherine Kelly Vidal
*Director of the United States Patent and Trademark Office*